US012386284B2

(12) United States Patent
Kikushima

(10) Patent No.: US 12,386,284 B2
(45) Date of Patent: Aug. 12, 2025

(54) DEVELOPING DEVICE

(71) Applicant: KYOCERA Document Solutions Inc., Osaka (JP)

(72) Inventor: Seiji Kikushima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/795,862

(22) Filed: Aug. 6, 2024

(65) Prior Publication Data

US 2025/0053115 A1 Feb. 13, 2025

(30) Foreign Application Priority Data

Aug. 9, 2023 (JP) ................................ 2023-130000

(51) Int. Cl.

*G03G 15/08* (2006.01)
*G03G 15/01* (2006.01)
*G03G 15/09* (2006.01)

(52) U.S. Cl.

CPC ..... *G03G 15/0812* (2013.01); *G03G 15/0121* (2013.01); *G03G 15/081* (2013.01); *G03G 15/0818* (2013.01); *G03G 15/0896* (2013.01); *G03G 15/0921* (2013.01); *G03G 15/0928* (2013.01); *G03G 2215/0609* (2013.01); *G03G 2215/0855* (2013.01); *G03G 2215/0858* (2013.01); *G03G 2215/0861* (2013.01);

(Continued)

(58) Field of Classification Search

CPC ............ G03G 15/0121; G03G 15/081; G03G 15/0812; G03G 15/0818; G03G 15/0896; G03G 15/0921; G03G 15/0928; G03G 2215/0609; G03G 2215/0855; G03G 2215/0858; G03G 2215/0861; G03G 2215/0866; G03G 2215/0869

See application file for complete search history.

(56) References Cited

U.S. PATENT DOCUMENTS

2004/0094742 A1* 5/2004 Kawano .................. H01F 1/083 252/62.55
2017/0090351 A1* 3/2017 Oshima .................. G03G 21/18
2022/0260947 A1* 8/2022 Sakamaki .......... G03G 15/0896

FOREIGN PATENT DOCUMENTS

JP 2007-147915 A 6/2007

* cited by examiner

*Primary Examiner* — Joseph S Wong
(74) *Attorney, Agent, or Firm* — Stein IP, LLC

(57) ABSTRACT

A developing device includes a cylindrical developing roller, a regulation member, a magnetic member, and a synthetic resin member. The regulation member includes a first opposing surface facing an outer circumferential surface of the developing roller. The magnetic member is arranged on a side surface of the regulation member. The synthetic resin member is arranged on a side surface of the magnetic member. The synthetic member includes a second opposing surface facing the outer circumferential surface of the developing roller. The second opposing surface is tilted at 40° or more but 60° or less with respect to the first opposing surface to be increasingly distant from the outer circumferential surface of the developing roller toward an upstream side in a rotating direction of the developing roller. A solubility parameter of a material of the synthetic resin member is 23 $(J/cm^3)^{1/2}$ or more. Magnetic toner contains toner and resin fine particles.

4 Claims, 2 Drawing Sheets

(52) U.S. Cl.
CPC ............... *G03G 2215/0866* (2013.01); *G03G 2215/0869* (2013.01)

DEVELOPING DEVICE

INCORPORATION BY REFERENCE

This application is based on and claims the benefit of priority from Japanese Patent Application No. 2023-130000 filed on Aug. 9, 2023, the contents of which are hereby incorporated by reference.

BACKGROUND

The present disclosure relates to a developing device.

A problem with conventional developing devices is that toner is likely to build up in an internal space of the developing device.

SUMMARY

A developing device of the present disclosure includes a cylindrical developing roller, a regulation member, a magnetic member, and a synthetic resin member. The developing roller houses a magnetic-field generating member and rotates. The regulation member includes a first opposing surface facing an outer circumferential surface of the developing roller. The magnetic member is arranged on a side surface, which is on an upstream side in a rotating direction of the developing roller, of the regulation member. The synthetic resin member is arranged on a side surface, which is on the upstream side in the rotating direction of the developing roller, of the magnetic member. The regulation member regulates a layer thickness of magnetic toner on the outer circumferential surface of the developing roller using the first opposing surface. The synthetic resin member includes a second opposing surface facing the outer circumferential surface of the developing roller. The second opposing surface is tilted at 40° or more but 60° or less with respect to the first opposing surface to be increasingly distant from the outer circumferential surface of the developing roller toward the upstream side in the rotating direction of the developing roller. A solubility parameter of a material of the synthetic resin member is 23 $(J/cm^3)^{1/2}$ or more. The magnetic toner contains toner and resin fine particles.

Further features of the present disclosure, and the specific benefits obtained according to the present disclosure, will become apparent from the description of embodiments which follows.

DETAILED DESCRIPTION

Figure 1:
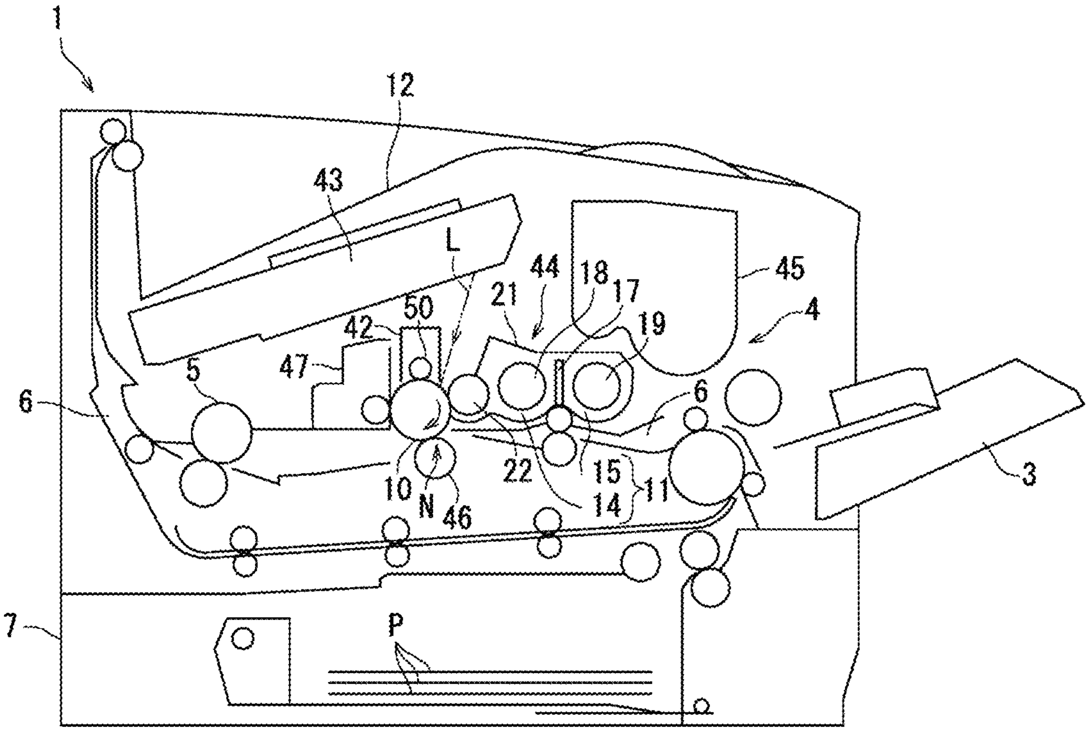
FIG. 1 is a view illustrating a configuration of an image forming apparatus according to an embodiment of the present disclosure.

Hereinafter, embodiments of the present disclosure are described, which is preceded by description of a problem of a conventional technique.

A conventional developing device may include a developing roller and a regulation blade. The regulation blade regulates an amount of toner held on the developing roller. Toner is likely to build up in a space (upstream space) on an upstream side relative to the regulation blade in a rotating direction of the developing roller.

According to a conventional technique, an elastic member is disposed in the upstream space where toner is likely to build up. The elastic member is disposed so as to occupy the upstream space in a state of being in close contact with an upstream surface, in the rotating direction of the developing roller, of the regulation blade. The upstream space is occupied by the elastic member and, accordingly, buildup of toner is suppressed.

The elastic member includes a conveyance-rate regulating surface facing a circumferential surface of the developing roller. The conveyance-rate regulating surface is configured to be increasingly distant from the developing roller toward an upstream side in the rotating direction of the developing roller. Toner that has left a developer storage and adhered onto the circumferential surface of the developing roller is gradually pushed back into the developer storage by the conveyance-rate regulating surface as the toner is advanced in the upstream space by rotation of the developing roller. In this way, buildup of a large amount of toner on the upstream side, in the rotating direction of the developing roller, relative to the regulation blade is suppressed.

However, there is a problem that toner can be adsorbed on the conveyance-rate regulating surface of the elastic member. It is difficult to desorb the adsorbed toner from the elastic member, and the toner may aggregate around the conveyance-rate regulating surface and form aggregated toner. The aggregated toner can cause clogging and produce image smears.

In view of the above-described problem, an object of the present disclosure is to provide a developing device capable of suppressing production of aggregated toner.

An embodiment of the present disclosure is described below with reference to the drawings. In the drawings, identical or corresponding elements are denoted by identical reference signs, and redundant description is omitted. In the present embodiment, an X axis, a Y axis, and a Z axis are orthogonal to each other; the X axis and the Y axis are parallel to a horizontal plane; and the Z axis is parallel to a vertical line.

First, a configuration of an image forming apparatus 1 according to a first embodiment is described with reference to FIG. 1. FIG. 1 is a view illustrating a configuration of the image forming apparatus 1. The image forming apparatus 1 may be, for instance, a monochrome printer.

As illustrated in FIG. 1, the image forming apparatus 1 includes an image forming unit 4, a fixing unit 5, a sheet discharge tray 12, a sheet conveyance path 6, a manual feed tray 3, a sheet feed cassette 7, and an operation unit (not illustrated).

The sheet feed cassette 7 accommodates sheets P. The sheets P may be, for instance, plain paper sheets, copy paper sheets, recycled paper sheets, thin paper sheets, thick paper sheets, glossy paper sheets, or an overhead projector (OHP) sheets. The sheets P are discharged onto the sheet discharge tray 12.

The conveyance path 6 conveys the sheet P from the sheet feed cassette 7 via the image forming unit 4 and the fixing unit 5 toward the sheet discharge tray 12.

The manual feed tray 3 is provided on a side surface on the right side in FIG. 1 of the image forming apparatus 1.

A plurality of menu setting keys for setting various menus and the like are arranged on the operation unit.

The image forming unit 4 forms a toner image on the sheet P based on image data fed from an external entity (e.g., a personal computer (PC)). Specifically, the image forming unit 4 includes a photoreceptor drum (image carrier) 10, a charging unit 42, an exposure unit 43, a developing device 44, a toner cartridge 45, a transfer roller (transfer member) 46, and a toner removal unit 47. With reference to a rotating direction (clockwise in FIG. 1) of the photoreceptor drum 10, the charging unit 42, the developing device 44, the transfer roller 46, and the toner removal unit 47 are arranged in this order along a circumferential direction of the photoreceptor drum 10. The exposure unit 43 is arranged above the charging unit 42.

The photoreceptor drum 10 is a drum having a photoreceptor; for instance, it is an aluminum cylinder having a surface where an amorphous silicon layer which is a positive-charging photoreceptor is deposited. A layer thickness of the amorphous silicon layer and a linear velocity of the photoreceptor drum 10 may be set as appropriate.

The charging unit 42 performs a charging process on the photoreceptor drum 10. Specifically, the charging unit 42 includes a charging roller 50, for instance. The charging roller 50 is composed of a mandrel and an epichlorohydrin rubber layer covering the mandrel. The charging roller 50 is for a contact-electrostatic charging method, which places a circumferential surface of the charging roller 50 in substantial point contact with a drum surface of the photoreceptor drum 10, and uniformly charges a surface potential of the drum surface by applying a predetermined reference charging voltage (reference charging bias), in which a direct current voltage and an alternating current voltage are superimposed, onto the drum surface.

The exposure unit 43 irradiates the charged photoreceptor drum 10 with laser light L to form an electrostatic latent image. Specifically, the exposure unit 43 includes a polygon mirror (not illustrated) for guiding the laser light L, which is based on image data input from an external personal computer (PC) or the like, to the drum surface of the photoreceptor drum 10. The polygon mirror forms an electrostatic latent image on the drum surface by scanning the drum surface of the photoreceptor drum 10 with the laser light L while being rotated by a predetermined driving source.

The developing device 44 causes toner to electrostatically adhere to the electrostatic latent image formed on the photoreceptor drum 10 for development into a toner image. The toner cartridge 45 supplies toner filled thereinside to the developing device 44.

The transfer roller 46 transfers the developed toner image onto the sheet P. Specifically, on the sheet conveyance path 6, the transfer roller 46 is in pressure contact with the drum surface of the photoreceptor drum 10 to form a nip N between the transfer roller 46 and the drum surface. Since a voltage having a polarity opposite to that of the surface potential of the drum surface is applied to the transfer roller 46, the toner image on the drum surface is transferred onto the sheet P when the sheet P passes through the nip N. The sheet P passed through the nip N is conveyed through the sheet conveyance path 6 to the fixing unit 5.

The toner removal unit 47 removes and collects toner remaining on the drum surface of the photoreceptor drum 10.

The fixing unit 5 heats the toner image formed on the sheet P to fix it onto the sheet P. In the fixing unit 5, after the toner image on the sheet P has been heated and fixed onto the sheet P, the sheet P is conveyed through the sheet conveyance path 6 onto the sheet discharge tray 12.

Figure 2:
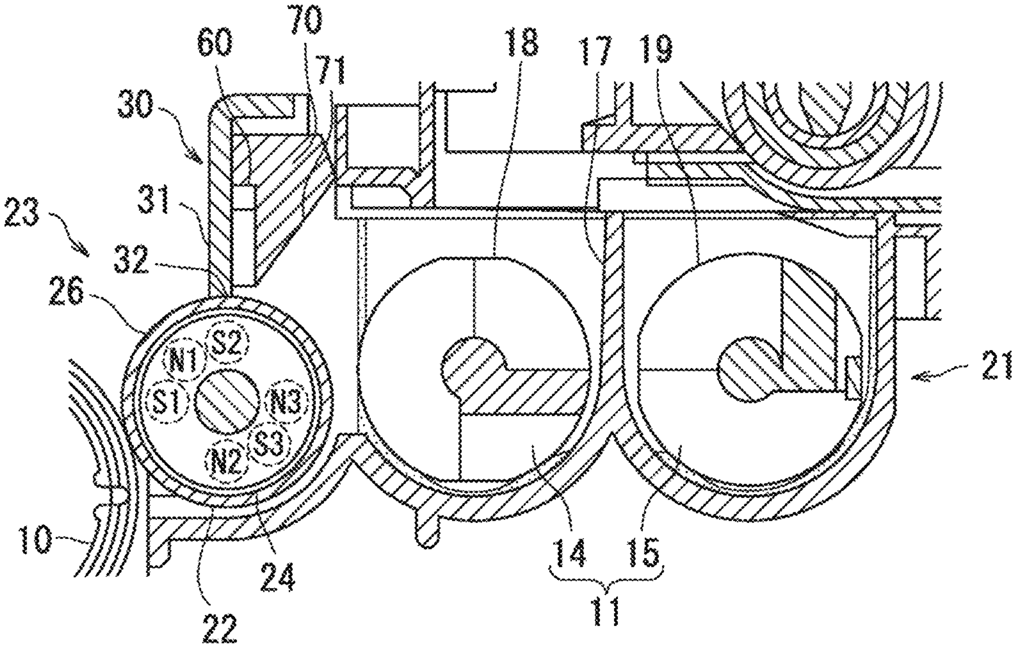
FIG. 2 is an enlarged view of a developing device according to the present embodiment.

With reference to FIG. 1 and FIG. 2, a configuration of the developing device 44 is described. FIG. 2 is an enlarged view of the developing device 44. As illustrated in FIG. 2, the developing device 44 develops an electrostatic latent image on the photoreceptor drum 10 using a magnetic one-component developer (magnetic toner).

The one-component developer (magnetic toner) contains toner, magnetic powder and resin fine particles. As the resin fine particles, for instance, particles of a styrene-acrylic resin may be contained. Examples of the styrene-acrylic resin include a copolymer of styrene, methyl methacrylate, and divinyl benzene and a copolymer of styrene, methyl methacrylate, and ethylene glycol dimethacrylate. A mean primary particle size of the particles of the styrene-acrylic resin is, for instance, 30 nm or more but 150 nm or less, and preferably 35 nm or more but 125 nm or less. A solubility parameter of the resin fine particles is preferably 18.4 $(J/cm^3)^{1/2}$ or more but 19.6 $(J/cm^3)^{1/2}$ or less, for instance. The magnetic one-component developer (magnetic toner) may contain silica particles, a binder resin, a charge control agent, and a release agent.

The developing device 44 includes a development container (housing) 21, a developer storage 11, a developing roller 22, a regulation member 30, and a magnet 60. The development container 21 defines an internal space of the developing device 44. The magnet 60 is an example of the "magnetic member."

The developer storage 11 is formed on a bottom wall of the development container 21. Specifically, the developer storage 11 is composed of two developer storage chambers 14 and 15 adjacent to each other and extending in a longitudinal direction (vertical direction with respect to the paper surface of FIG. 1) of the developing device 44. The developer storage chambers 14 and 15 are partitioned from each other in the longitudinal direction by a partition plate 17 made of, for instance, a metal such as aluminum but are in communication with each other at both end portions in the longitudinal direction.

The developer storage chambers 14 and 15 are respectively provided with screw feeders 18 and 19 that are rotatably mounted to convey the magnetic toner while agitating it by rotation. Since the screw feeders 18 and 19 are configured to have conveyance directions opposite to each other, the magnetic toner is conveyed between the developer storage chamber 14 and the developer storage chamber 15 while being agitated. The developer storage 11 receives toner from the toner cartridge 45 through a not-illustrated supply port.

The developing roller 22 is arranged in a developing opening 23 of the development container 21. The developing roller 22 is a roller member that includes a cylindrical developing sleeve 24 that is formed of a non-magnetic material such as aluminum and that extends in the longitudinal direction of the developing device 44 (i.e., an axial direction of the photoreceptor drum 10) and a not-illustrated rotation shaft for rotating the developing sleeve 24 counterclockwise in FIG. 2.

The developing sleeve 24 is arranged to face the photoreceptor drum 10 with a clearance of 0.2 mm to 0.4 mm between an outer circumferential surface 26 of the developing sleeve 24 and the drum surface of the photoreceptor drum 10. The developing sleeve 24 houses a magnetic-field generating member. The magnetic-field generating member is configured so as to have a south pole (S2) as an opposite pole facing the regulation member 30 and, downstream of the south pole (S2), a north pole (N1), a south pole (S1), a north pole (N2), a south pole (S3), and a north pole (N3) arranged in this order along a circumferential direction of the developing sleeve 24.

The regulation member 30 is a plate-like member disposed above the developing roller 22 in FIG. 2, extending along an axial direction of the developing sleeve 24, and made of a magnetic material, and includes a tip end portion 31 extending toward the outer circumferential surface 26 of the developing sleeve 24. The tip end portion 31 includes a first opposing surface 32 facing the outer circumferential surface 26. A gap of a predetermined dimension is defined between the first opposing surface 32 and the outer circumferential surface 26 of the developing sleeve 24. The regulation member 30 regulates a layer thickness of the magnetic toner on the outer circumferential surface 26 of the developing sleeve 24 using the first opposing surface 32.

The magnet 60 is arranged on a side surface, which is on an upstream side in a rotating direction of the developing sleeve 24, of the regulation member 30. The magnet 60 is adhered to the side surface of the regulation member 30 with an adhesive so as to have a south pole as an opposite pole facing the developing sleeve 24 and so that its end on the developing sleeve 24 side projects less than an end, which is on the developing sleeve 24 side, of the regulation member 30. The magnet 60 assists the regulation member 30 in regulating the layer thickness of the magnetic toner on the circumferential surface 26. The regulation of the layer thickness of the magnetic toner on the circumferential surface 26 is achieved through physical regulation by the regulation member 30 and magnetic regulation by the magnet 60.

As the developing sleeve 24 rotates, the magnetic toner on the outer circumferential surface 26 of the developing sleeve 24 is conveyed toward the drum surface of the photoreceptor drum 10 and caused to adhere to an electrostatic latent image on the drum surface of the photoreceptor drum 10 by a potential difference between a developing bias applied to the developing sleeve 24 and a drum bias applied to the photoreceptor drum 10. A toner image is formed on the drum surface in this way.

The developing device 44 further includes a synthetic resin member 70. The synthetic resin member 70 is arranged on a side surface, which is on the upstream side in the rotating direction of the developing sleeve 24, of the magnet 60. The synthetic resin member 70 extends along the axial direction of the developing sleeve 24. Specifically, the synthetic resin member 70 includes a second opposing surface 71 facing the outer circumferential surface 26 of the developing sleeve 24.

The second opposing surface 71 is, with reference to the rotating direction of the developing sleeve 24, located on the upstream side relative to the first opposing surface 32 of the regulation member 30 and configured to be increasingly distant from the developing sleeve 24 toward the upstream side in the rotating direction. In other words, the second opposing surface 71 is configured such that a clearance between the second opposing surface 71 and the outer circumferential surface 26 of the developing sleeve 24 gradually increases from the first opposing surface 32 toward upstream in the rotating direction of the developing sleeve 24. A part of the magnetic toner being conveyed is gradually pushed back by the second opposing surface 71 in a direction opposite to the rotating direction of the developing sleeve 24. The second opposing surface 71 regulates the amount of the magnetic toner conveyed to the first opposing surface 32 in this way. As a result, undesirable buildup of a large amount of the magnetic toner on the upstream side, with reference to the rotating direction, of the gap between the first opposing surface 32 and the outer circumferential surface 26 is suppressed.

The second opposing surface 71 is tilted at an angle of 40° or more but 60° or less with respect to the first opposing surface 32. With a configuration where the angle is smaller than 40°, due to excessive stress applied from the regulation member 30 to the magnetic toner, the amount of charge on the magnetic toner decreases, resulting in a decrease in image density on the sheet. The image density decreases greatly especially in a high-temperature environment. By contrast, with a configuration where the angle is larger than 60°, the magnetic toner builds up around the regulation member 30 and causes aggregation; the magnetic toner in the aggregated area becomes less prone to be regulated, which leads to an increase in conveyance rate of the magnetic toner and shortage of the amount of charge, and produces toner streaks (vertical streaks) on the sheet.

A solubility parameter of a material of the synthetic resin member 70 is 23 $(J/cm^3)^{1/2}$ or more. Examples of the material of the synthetic resin member 70 include acrylonitrile butadiene styrene (ABS) resins and polyamide resins. Further, a difference between the solubility parameter of the material of the synthetic resin member 70 and the solubility parameter of the resin fine particles is preferably 5 $(J/cm^3)^{1/2}$ or more.

As described above with reference to FIG. 1 and FIG. 2, since the second opposing surface 71 of the synthetic resin member 70 is tilted at 40° or more but 60° or less with respect to the first opposing surface 32, the solubility parameter of the material of the synthetic resin member 70 is 23 $(J/cm^3)^{1/2}$ or more, and the magnetic toner contains resin fine particles, adsorption of the magnetic toner onto the second opposing surface 71 of the synthetic resin member 70 can be suppressed. As a result, production of aggregated toner can be suppressed.

EXAMPLES

The present disclosure is described more specifically below by way of Examples (and Comparative Examples). Note that the present disclosure is by no means limited to the scope of Examples.

[Preparation of Silica Particles]

First, 30 g of dimethylpolysiloxane and 15 g of 3-aminopropyltrimethoxysilane (both manufactured by Shin-Etsu Chemical Co., Ltd.) were dissolved in 200 g of toluene and diluted 10-fold. Subsequently, the obtained diluted solution was gradually dripped into 200 g of fumed silica particles ("AEROSIL® 130" manufactured by NIPPON AEROSIL CO., LTD.) while stirring, and subjected to ultrasonication and stirring for 30 minutes to obtain a mixture. This mixture was heated in a thermostatic bath at 150° C., thereafter toluene was removed using a rotary evaporator, and the obtained solid was dried using a vacuum dryer at a temperature setting of 50° C. until there was no further weight reduction. Further, it was heated at 200° C. in an electric furnace for three hours under nitrogen atmosphere. The obtained powder was disintegrated using a jet mill and collected using a bag filter to obtain silica particles.

[Preparation of Resin Fine Particles]

(Preparation of Resin Fine Particles A)

Into a 500-ml flask equipped with a dropping funnel, a stirrer, a nitrogen gas inlet tube, a thermometer, and a reflux cooling pipe, 200 g of ion-exchanged water and 3 g of sodium lauryl sulfate were put. While heating the mixture to 80° C. under nitrogen atmosphere, 1 g of ammonium persulfate was added; further, a monomer mixture composed of 42 g of styrene, 40 g of methyl methacrylate, and 26 g of divinyl benzene was dripped into the flask over one hour, and the mixture was thereafter stirred for another one hour. The obtained reaction solution was cooled to room temperature, and thereafter filtered through a 300-mesh sieve to obtain an emulsion. By drying the obtained emulsion, resin fine particles A with a mean particle size of 80 nm and a solubility parameter (SP value) of 18.4 (J/cm$^3$)$^{1/2}$ were obtained.

(Preparation of Resin Fine Particles B)

Through the same procedure as that for the resin fine particles A except for that 1 g, rather than 3 g, of sodium lauryl sulfate was added, resin fine particles B with a mean particle size of 125 nm and a solubility parameter of 18.4 (J/cm$^3$)$^{1/2}$ were obtained.

(Preparation of Resin Fine Particles C)

Through the same procedure as that for the resin fine particles A except for that 10 g, rather than 3 g, of sodium lauryl sulfate was added, resin fine particles C with a mean particle size of 35 nm and a solubility parameter of 18.4 (J/cm$^3$)$^{1/2}$ were obtained.

(Preparation of Resin Fine Particles D)

Through the same procedure as that for the resin fine particles A except for that 42 g of styrene was changed to 31 g of the same, 40 g of methyl methacrylate was changed to 30 g of the same, and 26 g of divinyl benzene was changed to 79 g of ethylene glycol dimethacrylate, resin fine particles D with a mean particle size of 80 nm and a solubility parameter of 19.6 (J/cm$^3$)$^{1/2}$ were obtained.

Example 1

Magnetic toner of Example 1 was produced as follows. Using a mixer ("FM-20B" manufactured by Nippon Coke & Engineering Co., Ltd.), 1,100 g of polyester binder resin (manufactured by Kao Corporation, Mw: 6,500, acid value: 8.2 mg KOH/g, Tm: 96.3° C., Tg: 54.4° C.), 1,090 g of binder resin (manufactured by Kao Corporation, acid value: 11.8 mg KOH/g, Tm: 118.5° C., Tg: 59.6° C., gel fraction: 36%), 1,450 g of magnetic powder X (2×105 Ω·cm, "MRO-15A" manufactured by TODA KOGYO CORP.), 200 g of charge control agent ("FCA-482PLV" manufactured by Fujikura Kasei Co. Ltd.), and 160 g of release agent ("Carnauba wax Special No. 1" manufactured by S. KATO & CO.) were mixed at 2,000 rpm for five minutes.

The obtained mixture was melt-kneaded using a twin screw extruder ("TEM-26SS" manufactured by SHIBAURA MACHINE CO., LTD.) under conditions of a cylinder temperature of 120° C., a shaft rotation speed of 100 rpm, and 75 g/min. The obtained kneaded mixture was cooled, and thereafter the kneaded mixture was coarsely ground using a cutting mill ("Rotoplex 16/8" manufactured by HOSOKAWA MICRON CORPORATION). The obtained coarsely-ground material was finely ground using a pulverizing turbo mill TA (manufactured by Freund-Turbo Corporation). Subsequently, the material was input to a jet mill ("MJT-1" manufactured by HOSOKAWA MICRON CORPORATION) for fine milling and classification to obtain toner base particles Tn1.

To 1 kg of the obtained toner base particles, 12 g of the silica particles and 1 g of the resin fine particles A obtained using the above-mentioned methods were caused to adhere as external additives by mixing them at 3,200 rpm for five minutes using a mixer ("FM-10C" manufactured by Nippon Coke & Engineering Co., Ltd.). Thereafter, screening was performed using a 100-mesh sieve (opening size: 150 μm) to obtain the magnetic toner according to Example 1.

In the developing device, a synthetic resin member (mount blade) was made of an ABS resin having a solubility parameter of 23.7 (J/cm$^3$)$^{1/2}$ and arranged such that the second opposing surface is tilted at 50° with respect to the first opposing surface. As a result, a developing device according to Example 1 was obtained. In TABLE 1, TABLE 2, and TABLE 3 described later, "EX1" denotes Example 1.

Example 2

Example 2 is the same as Example 1 except for that the resin fine particles B were used in toner in place of the resin fine particles A. In TABLE 1, TABLE 2, and TABLE 3 described later, "EX2" denotes Example 2.

Example 3

Example 3 is the same as Example 1 except for that the resin fine particles C were used in toner in place of the resin fine particles A. In TABLE 1, TABLE 2, and TABLE 3 described later, "EX3" denotes Example 3.

Example 4

Example 4 is the same as Example 1 except for that the resin fine particles D were used in toner in place of the resin fine particles A. In TABLE 1, TABLE 2, and TABLE 3 described later, "EX4" denotes Example 4.

Example 5

Example 5 is the same as Example 1 except for that, in place of the synthetic resin member made of the ABS resin, a synthetic resin member made of a polyamide resin having a solubility parameter of 27.8 (J/cm$^3$)$^{1/2}$ was used in the developing device. In TABLE 1, TABLE 2, and TABLE 3 described later, "EX5" denotes Example 5.

Comparative Example 1

Comparative Example 1 is the same as Example 1 except for that the synthetic resin member was not used in the developing device. In TABLE 1, TABLE 2, and TABLE 3 described later, "CEX1" denotes Comparative Example 1.

Comparative Example 2

Comparative Example 2 is the same as Example 1 except for that, in place of the synthetic resin member made of the ABS resin, a synthetic resin member made of a high-density polystyrene resin having a solubility parameter of 18.4 (J/cm$^3$)$^{1/2}$ was used in the developing device. In TABLE 1, TABLE 2, and TABLE 3 described later, "CEX2" denotes Comparative Example 2.

Comparative Example 3

Comparative Example 3 is the same as Example 1 except for that the synthetic resin member (mount blade) was arranged such that the second opposing surface is tilted at 35° with respect to the first opposing surface in the developing device. In TABLE 1, TABLE 2, and TABLE 3 described later, "CEX3" denotes Comparative Example 3.

Comparative Example 4

Comparative Example 4 is the same as Example 1 except for that the synthetic resin member (mount blade) was arranged such that the second opposing surface is tilted at 65° with respect to the first opposing surface in the developing device. In TABLE 1, TABLE 2, and TABLE 3 described later, “CEX4” denotes Comparative Example 4.

Comparative Example 5

Comparative Example 5 is the same as Example 1 except for that the resin fine particles A were not used in toner. In TABLE 1, TABLE 2, and TABLE 3 described later, “CEX5” denotes Comparative Example 5.

TABLE 1 presents constitutions of the toners according to Example 1 to Example 5 and Comparative Example 1 to Comparative Example 5. Note that “St” represents styrene, “MMA” represents methyl methacrylate, “DVB” represents divinyl benzene, and “EGDM” represents ethylene glycol dimethacrylate.

TABLE 1

| | Toner | Constitution of resin fine particles in toner | | | |
|---|---|---|---|---|---|
| | | | Composition | Particle size [nm] | SP value $[(J/cm^3)^{0.5}]$ |
| EX1 | A | A | St/MMA/DVB | 80 | 18.4 |
| EX2 | B | B | St/MMA/DVB | 125 | 18.4 |
| EX3 | C | C | St/MMA/DVB | 35 | 18.4 |
| EX4 | D | D | St/MMA/EGDM | 80 | 19.6 |
| EX5 | A | A | St/MMA/DVB | 80 | 18.4 |
| CEX1 | A | A | St/MMA/DVB | 80 | 18.4 |
| CEX2 | A | A | St/MMA/DVB | 80 | 18.4 |
| CEX3 | A | A | St/MMA/DVB | 80 | 18.4 |
| CEX4 | A | A | St/MMA/DVB | 80 | 18.4 |
| CEX5 | E | None | | | |

TABLE 2 presents the synthetic resin members (mount blades) in the developing devices according to Example 1 to Example 5 and Comparative Example 1 to Comparative Example 5. Note that “ABS” represents an ABS resin, “PA” represents a polyamide resin, and “HIPS” represents a high-density polystyrene resin.

TABLE 2

| | Mount blade | | | |
|---|---|---|---|---|
| | Provided/Not provided | Resin | SP value $[(J/cm^3)^{0.5}]$ | Angle [°] |
| EX1 | Provided | ABS | 23.7 | 50 |
| EX2 | Provided | ABS | 23.7 | 50 |
| EX3 | Provided | ABS | 23.7 | 50 |
| EX4 | Provided | ABS | 23.7 | 50 |
| EX5 | Provided | PA | 27.8 | 50 |
| CEX1 | Not provided | | | |
| CEX2 | Provided | HIPS | 18.4 | 50 |
| CEX3 | Provided | ABS | 23.7 | 35 |
| CEX4 | Provided | ABS | 23.7 | 65 |
| CEX5 | Provided | ABS | 23.7 | 50 |

<Evaluation of Printing Performance Endurance Using Actual Machines>

Using the toners and the developing devices according to Example 1 to Example 5 and Comparative Example 1 to Comparative Example 5 and using a monochrome printer ECOSYS® P2040dw manufactured by KYOCERA Document Solutions Inc., 2-sheet intermittent printing of an image document with a coverage rate of 2% was performed to print 100,000 sheets and 5,000 sheets in an environment where the temperature was 23° C. and the humidity was 65% and an environment where the temperature was 28° C. and the humidity was 80%, respectively. Image densities at each of the initial states, after printing 100,000 sheets in the environment where the temperature was 23° C. and the humidity was 65%, and after printing 5,000 sheets in the environment where the temperature was 28° C. and the humidity was 80%, and presence/absence of a white streak in 100,000 printouts produced in the environment where the temperature was 23° C. and the humidity was 65% were evaluated.

Good: No vertical streak (white streak or black streak) was observed in the 100,000 printouts.

Bad: A vertical streak(s) (white streak or black streak) was observed in the 100,000 printouts.

The results are presented in TABLE 3.

TABLE 3

| | Image density (N/N) | | | |
|---|---|---|---|---|
| | Initial | After 100,000-sheet printing | After 5,000-sheet printing at high temperature | White streak |
| EX1 | 1.43 | 1.41 | 1.31 | Good |
| EX2 | 1.40 | 1.40 | 1.33 | Good |
| EX3 | 1.44 | 1.42 | 1.34 | Good |
| EX4 | 1.40 | 1.37 | 1.31 | Good |
| EX5 | 1.42 | 1.42 | 1.29 | Good |
| CEX1 | 1.44 | 1.42 | 1.32 | Bad |
| CEX2 | 1.39 | 1.37 | 1.29 | Bad |
| CEX3 | 1.32 | 1.33 | 1.30 | Bad |
| CEX4 | 1.46 | 1.39 | 1.07 | Good |
| CEX5 | 1.38 | 1.32 | 1.19 | Bad |

As described above, in Comparative Example 1 to Comparative Example 3 and Comparative Example 5, the magnetic toner built up around the regulation member and caused aggregation; the magnetic toner in the aggregated area became less prone to be regulated, which led to an increase in conveyance rate of the magnetic toner and shortage of the amount of charge, and produced toner streaks (vertical streaks) on the sheet. In Comparative Example 4, due to excessive stress applied from the regulation member to the magnetic toner, the amount of charge on the magnetic toner decreased, resulting in a decrease in image density on the sheet. The image density decreased greatly especially in the high-temperature environment.

By contrast, in Example 1 to Example 5, no toner streak was produced on the sheets, and decrease in image density was suppressed even in the high-temperature environment.

The developing device of the present disclosure can suppress production of aggregated toner.

The developing device according to the present disclosure is usable in an image forming apparatus.

What is claimed is:

1. A developing device comprising:

a developing roller being cylindrical in shape, housing a magnetic-field generating member, and rotating;

a regulation member including a first opposing surface facing an outer circumferential surface of the developing roller;

a magnetic member arranged on an upstream side surface of the regulation member with respect to a rotating direction of the developing roller; and a synthetic resin member arranged on an upstream side surface of the magnetic member with respect to the rotating direction of the developing roller, wherein the regulation member regulates a layer thickness of magnetic toner on the outer circumferential surface of the developing roller using the first opposing surface, the synthetic resin member includes a second opposing surface facing the outer circumferential surface of the developing roller, the second opposing surface is tilted at 40° or more but 60° or less with respect to the first opposing surface to be increasingly distant from the outer circumferential surface of the developing roller toward an upstream side in the rotating direction of the developing roller, a solubility parameter of a material of the synthetic resin member is 23 $(J/cm^3)^{1/2}$ or more, and the magnetic toner contains toner and resin fine particles.

2. The developing device according to claim 1, wherein the resin fine particles contain particles of a styrene-acrylic resin, and a mean primary particle size of the particles of the styrene-acrylic resin is 30 nm or more but 150 nm or less.

3. The developing device according to claim 1, wherein a difference between a solubility parameter of the resin fine particles and the solubility parameter of the material of the synthetic resin member is 5 $(J/cm^3)^{1/2}$ or more.

4. The developing device according to claim 1, wherein the material of the synthetic resin member is an acrylonitrile butadiene styrene (ABS) resin or a polyamide resin.

* * * * *